Patented Apr. 25, 1933

1,905,974

UNITED STATES PATENT OFFICE

JOHN W. LIVINGSTON, OF KIRKWOOD, MISSOURI, ASSIGNOR TO MONSANTO CHEMICAL WORKS, OF ST. LOUIS, MISSOURI, A CORPORATION OF MISSOURI

MANUFACTURE OF LIQUID DIALKYL PHTHALATE ESTERS

No Drawing. Application filed December 21, 1931. Serial No. 582,507.

This invention relates to the manufacture of diphenyl phthalates and dialkyl phthalates obtained by reacting phthalic anhydride with an alkyl alcohol in the presence of an esterification catalyst, and it has particular application to the purification of the ester whereby a clear, colorless, odorless product is obtained.

When phthalic anhydride and an alkyl alcohol, such as normal butyl alcohol, are caused to react in the presence of a small quantity of sulfuric acid or other esterification catalyst, a discoloration and odor are developed and imparted to the ester which persists even after repeated washing with water or an alkaline solution. The source of these malcharacteristics have not been ascertained. It is known, however, that they develop even though the phthalic anhydride employed is of the best commercial grade and the alcohol is freshly distilled. Inasmuch as this class of products is employed in the manufacture of cellulose acetate, molded products, nitro-cellulose lacquers, pyroxylin, etc., any color or odor which is developed is objectionable since it is transmitted to the ultimate product.

The object of this invention is to provide a method of treatment for diphenyl and di-alkyl phthalates, such as dimethyl phthalate, diethyl phthalate, dibutyl phthalate, dicresyl phthalate, diphenyl phthalate, phenyl cresyl phthalate, etc., whereby the objectionable characteristics mentioned above are eliminated.

For the purpose of the present invention, an alkyl ester may be produced in the usual manner by reacting the alcohol with phthalic anhydride in the presence of an esterification catalyst. After the esterification is complete, the excess alcohol is removed by distillation or extraction with water, and the catalyst employed in the esterification is neutralized or otherwise removed. The ester is then treated with an aqueous solution of a permanaganate, such as, potassium permanganate and sodium permanganate, whereby the odor and color imparting impurities are destroyed. Any manganese dioxide formed is removed advantagously by filtration or with the aid of acid, after which the ester is washed with water and dried. The product so obtained is odorless, colorless, and clear.

One method of practicing my invention as applied to the manufacture of dibutyl phthalate is hereinafter set forth.

A crude dibutyl phthalate is prepared for the purpose of illustrating the present invention by dissolving 250 parts of phthalic anhydride in 250 parts of butanol. Four parts of 60° Bé. sulfuric acid mixed in 250 parts of butanol are then added to the phthalic anhydride-butanol solution. The mixture is boiled for approximately 18-20 hours, during which time the vapors are condensed and the condensate collected in a separate vessel. The alcohol layer of the condensate is returned continuously to the esterification vessel. During the course of the esterification, the temperature of the esterification mixture rises slowly to approximately 135°-140° C. The temperature of the vapors evolved from the reaction mixture at the end of the reaction is approximately 114° C. After the esterification is complete, the excess butanol is removed by distillation, preferably at reduced pressures.

The last traces may be separated advantageously by steam distillation. The resulting mixture is washed with water to remove the acid and subsequently with sodium carbonate to insure complete neutralization.

The crude product so obtained has a hazy colored cast and an objectionable odor which is removed by agitating with an equal weight of 1% aqueous potassium permanganate solution for approximately 12-14 hours at 50° C. The manganese dioxide which is precipitated is separated conveniently by filtration, having previously washed the excess permanganate from the ester by means of water.

Another method of removing the permanganate and manganese dioxide which may be employed advantageously involves acidifying the treated ester by adding 10 grams of 60° Bé. sulfuric acid and subsequently admixing sufficient sulfur dioxide, sodium sulfite or bisulfite to destroy the brown coloration of the manganese dioxide and permanganate. Thereafter the ester is separated from the aqueous fraction, washed with water and subsequently with a solution of soda ash to insure neutralization. The soda ash solution is then removed by washing with water, after which the ester is dehydrated at 80° C. for one to two hours at a reduced pressure. A similar dehydrating step is applied to the filtered ester. The product so obtained will be found to be practically devoid of odor or color.

The method described above for the treatment of dibutyl phthalate is applicable to other liquid dialkyl phthalates, such as diethyl phthalate, dimethyl phthalate, diamyl phthalate, the phthalate ester, monomethyl ether of ethylene glycol, etc. If desired, one may augment the permanganate purification by the addition of a small quantity of bone char or absorbent carbon before the filtration operation. However, in general, the addition of this material will be found unnecessary.

Diphenyl phthalate is made conveniently by adding anhydrous phenol to phthalyl chloride, using approximately two molar proportions of phenol and one molar proportion of phthalyl chloride. The product so obtained is contaminated with small quantities of unreacted phenol, chlorinated by-products and small amounts of color and odor imparting impurities which cannot be separated conveniently by the ordinary means of purification. The crude material so obtained is washed with a dilute solution of sodium hydroxide whereby it is neutralized, and the excess phenol is dissolved. The excess caustic is removed and the ester acidified slightly before adding 1% by weight based on the ester of potassium permanganate. The permanganate may be added advantageously in the form of a dilute aqueous solution. Although the quanity of permanganate required will vary, in general, the amount prescribed above will be found adequate. The charge is agitated for a period of 15-20 hours while maintaining the temperature at approximately 80° C. at which temperature the ester is liquid. At the end of this period, the permanganate coloration persists indicating that the treatment is complete. In case the characteristic permanganate coloration disappears, additional permanganate is added and the charge agitated for an additional period.

The ester is then recovered either by repeatedly washing with water and thereafter separating the precipitated manganese dioxide by filtration, or by decanting the aqueous permanganate solution and dissolving the precipitated manganese dioxide by the addition of a reducing agent, such as a sulfur dioxide containing reagent, notably, sodium sulfite, sodium bisulfite, or sulfur dioxide, preferably after acidification with a small quantity of sulfuric acid. Thereafter, the ester is washed with water to remove the remaining water soluble constituents, and finally is dried.

Although there has been described but a single specific example of the application of the principles of my invention, together with certain alternative steps which may be employed, it will be recognized by those skilled in the art that the invention is not limited to any particular source of phthalate esters or to the procedure which is specifically set forth hereinabove, but on the contrary, extends to a wide variety of modifications and contemplates broadly the treatment of crude neutral phthalate esters by means of permanganate whereby the normal color and odor imparting constituents which are associated with the crude ester are destroyed.

What I claim is:

1. In the process of manufacturing liquid dialkyl phthalates by the reaction of phthalic anhydride with an alkyl alcohol in the presence of an esterification catalyst, the step of purification of the crude ester which comprises treatment of the same with an aqueous solution of a permanganate.

2. In the process of manufacturing liquid dialkyl phthalates by the reaction of phthalic anhydride with an alkyl alcohol in the presence of an esterification catalyst, the step of purification of the crude ester which comprises treatment of the same with an aqueous solution of a permangante, and separating the manganese dioxide formed during the permanganate treatment.

3. In the process of manufacturing liquid dialkyl phthalates by the reaction of phthalic anhydride with an alkyl alcohol in the presence of an esterification catalyst, the step of purification of the crude ester which comprises treatment of the same with aqueous solution of a permanganate, and separating the manganese dioxide formed during the permanganate treatment by filtration.

4. In the process of manufacturing liquid dialkyl phthalates by the reaction of phthalic anhydride with an alkyl alcohol in the presence of an esterification catalyst, the step of purification of the crude ester which comprises treatment of the same with an aqueous solution of a permanganate and separating the manganese dioxide formed during the permanganate treatment by dissolving the manganese dioxide with a soluble inorganic compound containing the radical $SO_2$.

5. In the process of manufacturing dibutyl phthalate by the reaction of phthalic anhydride with butanol in the presence of an esterification catalyst, the step of purification of the crude ester which comprises treatment of the same with an aqueous solution of a permanganate.

6. In the process of manufacturing diethyl phthalate by the reaction of phthalic anhydride with ethanol in the presence of an esterification catalyst, the step of purification of the crude ester which comprises treatment of the same with an aqueous solution of a permanganate.

7. In the process of manufacturing dimethyl phthalate by the reaction of phthalic anhydride with methanol in the presence of an esterification catalyst, the step of purification of the crude ester which comprises treatment of the same with an aqueous solution of a permanganate.

8. In the process of manufacturing dibutyl phthalate by the reaction of phthalic anhydride with butanol in the presence of a small amount of sulfuric acid, the step of purification of the crude ester which comprises treatment of the same with an aqueous solution of potassium permanganate.

9. In the process of manufacturing dibutyl phthalate by the reaction of phthalic anhydride with butanol in the presence of a small amount of sulfuric acid, the step of purification of the crude ester which comprises treatment of the same with an aqueous solution of potassium permanganate and subsequent washing with an aqueous solution of sodium carbonate.

10. In the process for refining neutral esters of phthalic acid, the steps which include treating the ester while in a liquid condition with an aqueous solution of a permanganate, the amount thereof being sufficient for the permanganate coloration to persist, and thereafter recovering the ester.

11. The method as described in claim 10 and further characterized in that the manganese dioxide resulting from the treatment is dissolved by means of a sulfur dioxide containing reagent.

12. In a process for refining neutral esters of phthalic acid selected from a group consisting of diphenyl phthalate, diethyl phthalate, and dibutyl phthalate, the steps which include treating the ester while in a liquid condition with a dilute aqueous solution of a permanganate, the amount thereof being sufficient for the permanganate coloration to persist, recovering the ester from the aqueous solution and the precipitated manganese dioxide resulting from the treatment whereby a colorless product is obtained, and finally drying the product.

In testimony whereof, I affix my signature.

JOHN W. LIVINGSTON.